United States Patent
Calene et al.

(10) Patent No.: US 10,329,167 B2
(45) Date of Patent: Jun. 25, 2019

(54) COMPACT HIGH-EFFICIENCY SOLAR DISTILLATION DEVICE

(71) Applicants: John L. Calene, Franklin, MI (US); Garth J. Schultz, Oxford, MI (US)

(72) Inventors: John L. Calene, Franklin, MI (US); Garth J. Schultz, Oxford, MI (US)

( * ) Notice: Subject to any disclaimer, the term of this patent is extended or adjusted under 35 U.S.C. 154(b) by 119 days.

(21) Appl. No.: 15/370,293

(22) Filed: Dec. 6, 2016

(65) Prior Publication Data

US 2017/0158525 A1 Jun. 8, 2017

Related U.S. Application Data

(60) Provisional application No. 62/263,800, filed on Dec. 7, 2015.

(51) Int. Cl.
*C02F 1/14* (2006.01)
*B01D 1/00* (2006.01)
(Continued)

(52) U.S. Cl.
CPC ............. *C02F 1/14* (2013.01); *B01D 1/0035* (2013.01); *B01D 1/0064* (2013.01);
(Continued)

(58) Field of Classification Search
CPC .. B01D 1/0035; B01D 1/0064; B01D 1/0094; B01D 1/04; B01D 1/2896; B01D 3/42; B01D 5/006; B01D 5/0075; B01D 5/009; C02F 1/001; C02F 1/14; C02F 1/048; C02F 2301/028; C02F 2301/043; C02F 2303/16; C02F 2103/08; Y02A 20/128; Y02A 20/212
See application file for complete search history.

(56) References Cited

U.S. PATENT DOCUMENTS 3,558,436 A   1/1971  Foley et al.
3,880,719 A * 4/1975  Massie ..................... B01D 1/04
                                                              202/234

(Continued)

FOREIGN PATENT DOCUMENTS

EP   0063524 A1 * 10/1982 ........... B01D 5/0066
FR   2727957 A1 *  6/1996 ................ C02F 1/14

OTHER PUBLICATIONS

EP0063524A1_ENG (Espacenet machine translation of Pedone) (Year: 1982).*

(Continued)

*Primary Examiner* — Youngsul Jeong
*Assistant Examiner* — Gabriel E Gitman
(74) *Attorney, Agent, or Firm* — Harness, Dickey & Pierce, P.L.C.

(57) ABSTRACT

A solar distillation apparatus configured to produce a distillate from a source liquid mixture, including a base member defining at least one flow path, a transparent cover panel spaced apart from the base member to define a volume therebetween; and an intermediate panel positioned between the base member and the transparent cover panel to divide the volume into an evaporation chamber and a condensation chamber, wherein the evaporation chamber communicates with the condensation chamber, the flow path of the base member is configured to carry the source liquid mixture in a first direction in the evaporation chamber to increase evaporation of a liquid from the source liquid mixture, and the evaporated liquid is configured to flow from the evaporation chamber in a second and opposite direction into the condensation chamber where the evaporated liquid condenses into the distillate.

13 Claims, 11 Drawing Sheets

(51) Int. Cl.
  *B01D 5/00* (2006.01)
  *B01D 1/04* (2006.01)
  *B01D 1/28* (2006.01)
  *B01D 3/42* (2006.01)
  *C02F 1/00* (2006.01)
  *C02F 1/04* (2006.01)
  *C02F 103/08* (2006.01)

(52) U.S. Cl.
  CPC ............ *B01D 1/0094* (2013.01); *B01D 1/04* (2013.01); *B01D 1/2896* (2013.01); *B01D 3/42* (2013.01); *B01D 5/006* (2013.01); *B01D 5/009* (2013.01); *B01D 5/0075* (2013.01); *C02F 1/001* (2013.01); *C02F 1/048* (2013.01); *C02F 2103/08* (2013.01); *C02F 2301/028* (2013.01); *C02F 2301/043* (2013.01); *C02F 2303/16* (2013.01); *Y02A 20/128* (2018.01); *Y02A 20/212* (2018.01)

(56) References Cited

U.S. PATENT DOCUMENTS

| | | | | |
|---|---|---|---|---|
| 3,986,936 | A * | 10/1976 | Rush | C02F 1/14 202/234 |
| 4,253,271 | A * | 3/1981 | Raymond | A01G 9/243 47/1.4 |
| 4,363,703 | A | 12/1982 | ElDifrawi et al. | |
| 4,406,749 | A * | 9/1983 | Wetzel | C02F 1/14 202/234 |
| 6,773,608 | B1 * | 8/2004 | Hallett | A61L 2/0047 210/748.11 |
| 8,088,257 | B2 * | 1/2012 | Kemp | B01D 1/0035 202/234 |
| 2004/0060808 | A1 * | 4/2004 | LaViolette | B01D 3/346 202/234 |
| 2005/0044862 | A1 * | 3/2005 | Vetrovec | B01D 5/0066 62/93 |
| 2010/0307910 | A1 * | 12/2010 | Engelhart | B01D 1/0035 203/21 |
| 2013/0091878 | A1 | 4/2013 | Jankowski et al. | |
| 2014/0165995 | A1 * | 6/2014 | Levin | B01D 1/0035 126/652 |
| 2015/0223409 | A1 | 8/2015 | Abahusayn | |

OTHER PUBLICATIONS

FR2727957A1_ENG (Espacenet machine translation of Sejourne) (Year: 1996).*

International Search Report and Written Opinion of the International Searching Authority for PCT/US2016/065332, dated Apr. 10, 2017.

* cited by examiner

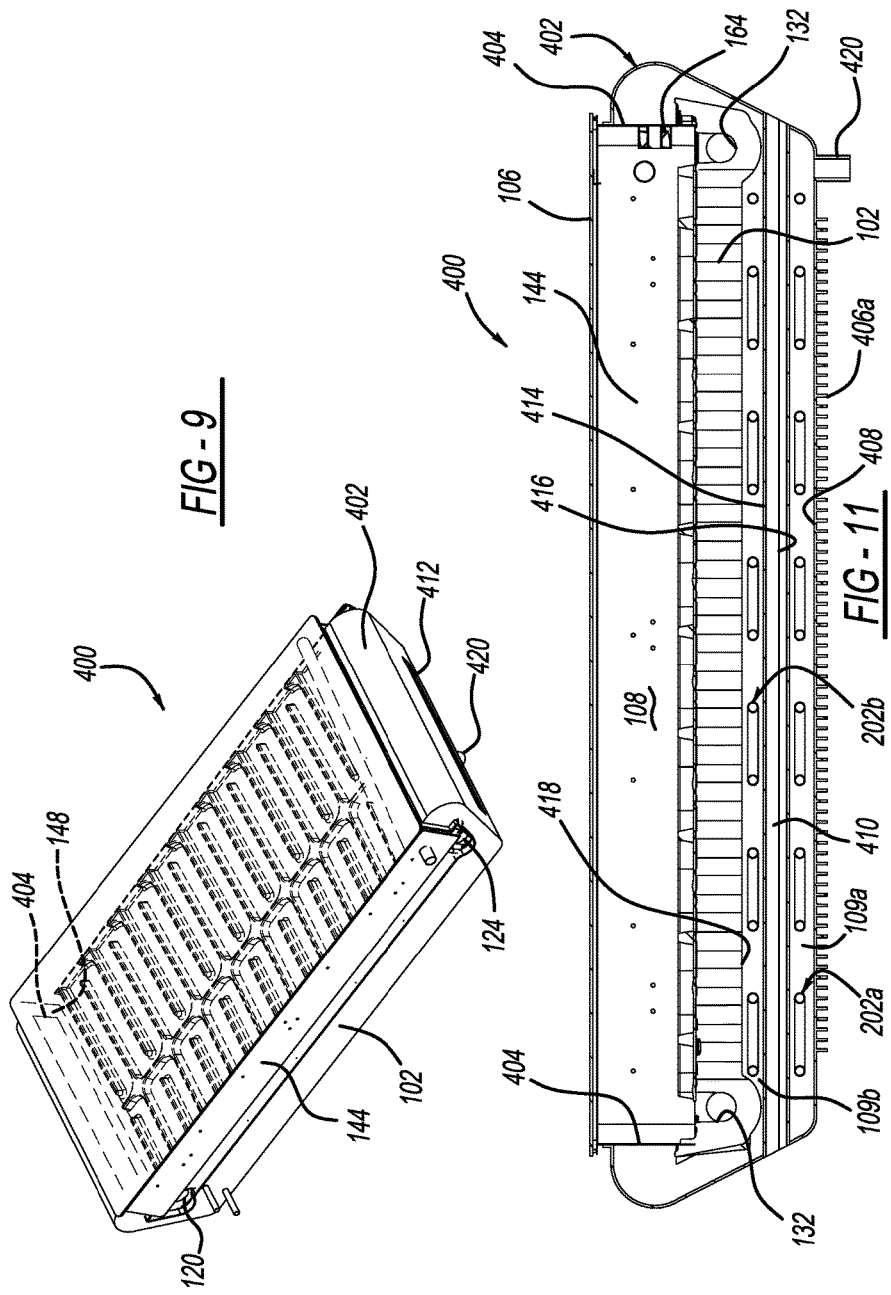

COMPACT HIGH-EFFICIENCY SOLAR DISTILLATION DEVICE

CROSS-REFERENCE TO RELATED APPLICATIONS

This application claims the benefit of U.S. Provisional Application No. 62/263,800, filed on Dec. 7, 2015. The entire disclosure of the above application is incorporated herein by reference.

FIELD

The present disclosure relates to a solar distillation device.

BACKGROUND

This section provides background information related to the present disclosure which is not necessarily prior art.

Critical shortages of water have created great distress for many populations around the world. A great need exists, therefore, particularly throughout the developing world, for safe and reliable supplies of fresh water for human consumption and use. A number of methods, such as desalination of sea water by distillation, currently exist for providing fresh water. Only limited technology is currently available that utilizes the energy from sunlight to accomplish purification via distillation. Further, this limited technology tends to be inefficient, bulky, and difficult to move or install quickly.

For example, a device known as a solar still is a water desalination/purification device that includes an insulated basin that contains a maintained level of brine (or otherwise contaminated water or other fluid amenable to purification by distillation—all hereinafter referred to simply as "brine" for brevity). The brine is of, or maintained at, a concentration within a range compatible with both distillation in the conditions expected, and the need to allow for flow in a given design. To that end, the brine may be introduced by direct filling, or through an inlet, and may be released through an outlet. The basin is typically arranged such that the basin and the brine contained therein are exposed to solar irradiation that warms the brine and causes evaporation. The basin further includes a transparent cover panel (typically of glass) that is inclined. As the brine evaporates, fresh water condenses on the inclined cover panel and drains toward a trough that collects the fresh water and directs it out of the solar still, where it can subsequently be used for drinking or some other use. Such a configuration is relatively simple, compact, and inexpensive. Such a configuration, however, is also very inefficient.

Another solar distillation technology that is often used for seawater desalination and purification is commonly referred to as a Humidification Dehumidification Desalination (HDD) system. The HDD system operates essentially on the same principle as the solar still, but requires the use of two columns or towers. In the HDD system, a circuitous flow of an air/water vapor mixture is induced by spraying (or otherwise introducing) a brine mist into a humidification tower, within which an upward draft of airflow is maintained, and into which some or all of the brine mist is evaporated. The evaporation rate is dependent, in large part, on the temperature of the brine, which is typically raised by an external solar collection device via a heat exchanger. Unevaporated brine falls into a brine reservoir accessible from the base of the humidification tower. The humidified air (air/water vapor mixture) continues to move upward, and is then ducted to the top of a dehumidification tower where it is directed downward. Within this second tower, a series of coils (or other suitable heat exchange medium) into which unheated brine from the aforementioned brine reservoir flows. This unheated brine is at such a temperature that the relatively warm air/water vapor mixture flowing across the coils is cooled sufficiently to induce condensation of fresh water onto the coil surface. The condensation drips off the coils into a collection reservoir at the base of the tower. The heat deposited into the coils via this condensation is then transferred to the initially unheated brine, which therefore exits the coils at an increased temperature. In turn, this "preheated" brine is directed to further heating by the aforementioned external heat exchanger, and is directed as previously described into the humidification tower. The air/water vapor mixture that had passed over the coils and released some or all of its moisture content (i.e., dehumidified air) is now ducted across to the base of the humidification tower, where it is exposed to the incoming spray of brine, and the cycle continues in this manner. The HDD system, however, tends to rather bulky and, therefore, is not very practical in many settings where space is limited or difficult to reach (i.e., in disaster relief settings).

There is a need, therefore, for a solar distillation device that is compact and easily movable, and also high efficiency to obtain maximum yields of fresh water.

SUMMARY

This section provides a general summary of the disclosure, and is not a comprehensive disclosure of its full scope or all of its features.

The present disclosure provides a solar distillation apparatus configured to produce a distillate from a source liquid mixture, including a base member defining at least one flow path, a transparent cover panel spaced apart from the base member to define a volume therebetween; and an intermediate panel positioned between the base member and the transparent cover panel to divide the volume into an evaporation chamber and a condensation chamber, wherein the evaporation chamber communicates with the condensation chamber, the flow path of the base member is configured to carry the source liquid mixture in a first direction in the evaporation chamber to increase evaporation of a liquid from the source liquid mixture, and the evaporated liquid is configured to flow from the evaporation chamber in a second and opposite direction into the condensation chamber where the evaporated liquid condenses into the distillate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a cross-sectional view of the distillation apparatus illustrated in FIG. 6;

FIG. 9 is a perspective view of another distillation including apparatus according to a principle of the present disclosure;

FIG. 11 is a cross-sectional view of the distillation apparatus illustrated in FIG. 9;

FIG. 15 is a cross-sectional view of the distillation apparatus illustrated in FIG. 13.

Corresponding reference numerals indicate corresponding parts throughout the several views of the drawings.

DETAILED DESCRIPTION

Example embodiments will now be described more fully with reference to the accompanying drawings.

Figure 1:
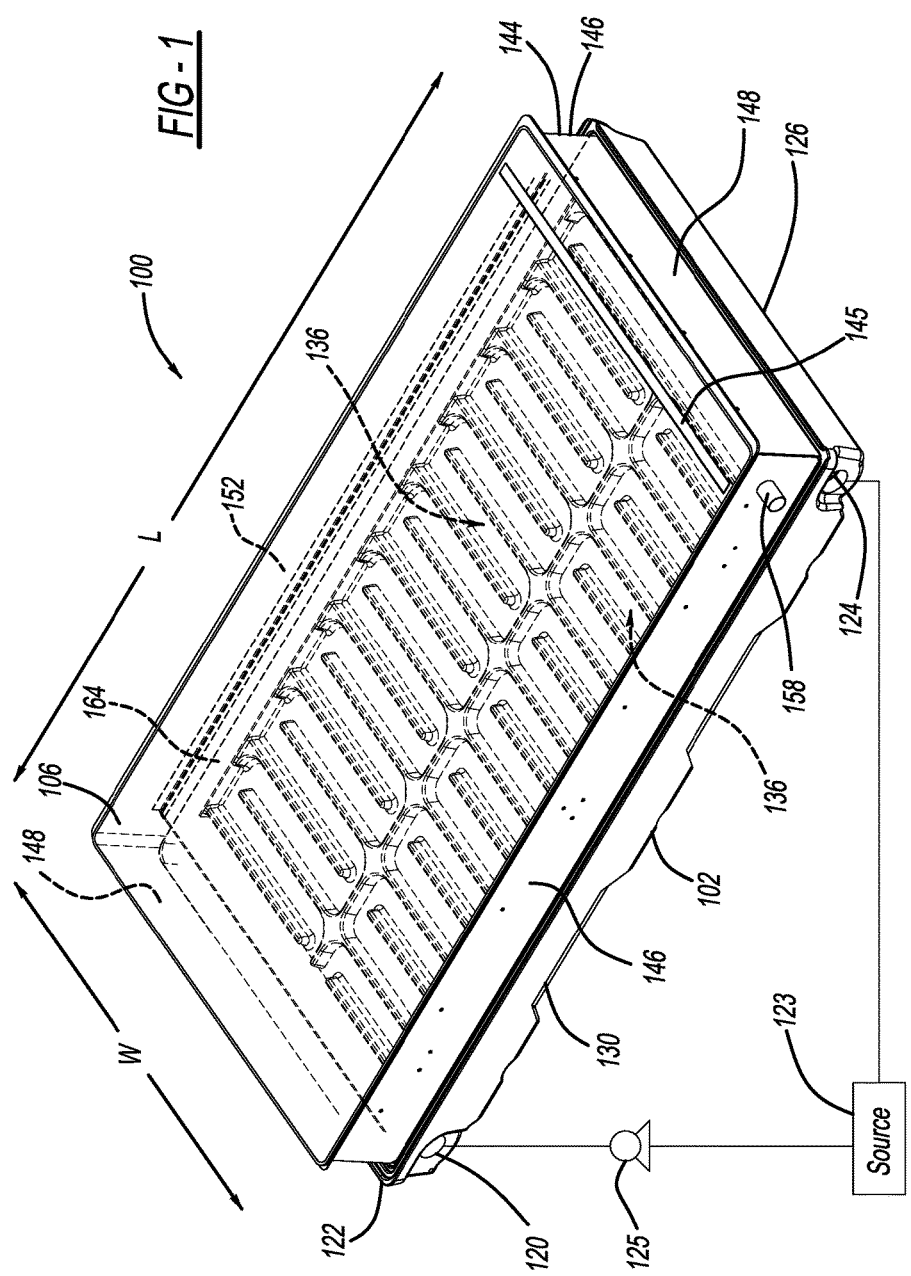
FIG. 1 is a perspective view of a distillation apparatus according to a principle of the present disclosure.
Figure 2:
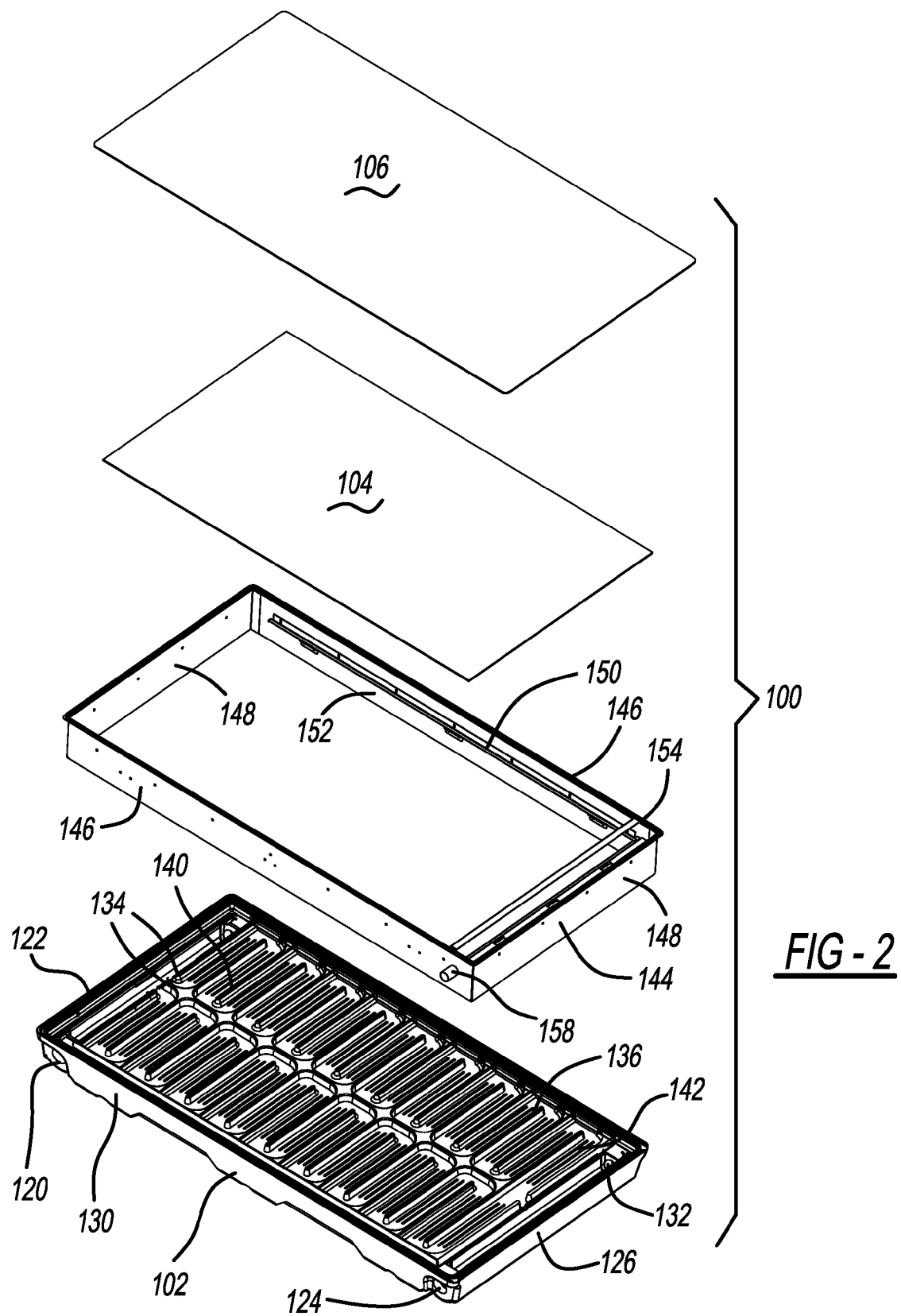
FIG. 2 is an exploded perspective view of the distillation apparatus illustrated in FIG. 1.
Figure 3:
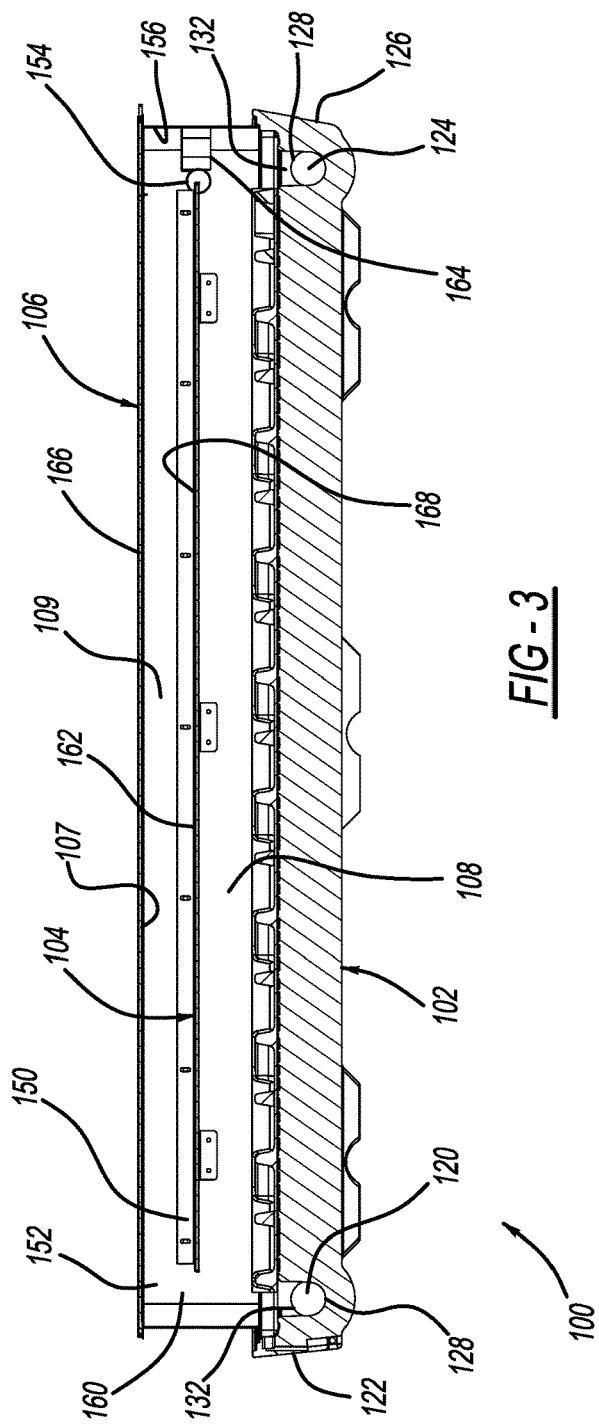
FIG. 3 is a cross-sectional view of the distillation apparatus illustrated in FIG. 1.

The distillation apparatus 100 illustrated in FIGS. 1-3 includes features intended for the production of potable water from seawater, or water otherwise contaminated with nonvolatile impurities. The present invention may also be used—when configured and adjusted appropriately—for distillation of other liquids chemically compatible with the materials of its construction and otherwise compatible with the temperatures and overall process it supports. For brevity hereafter—and because a large number of such applications may involve mixtures of water, and further in a key intended application of desalination, the source liquid mixture is described as "brine" throughout the specification. One may therefore substitute the phrase "suitable source liquid mixture" for "brine" as desired. Similarly, the term "distillate" is used to describe the output product in general, with water being the distillate in many common applications.

According to the present disclosure, the distillation apparatus is designed to have a configuration that is compact and easily movable. In a first embodiment of the present disclosure, distillation apparatus 100 includes a dual-chamber configuration for increasing evaporation of the water from the brine, and for increasing condensation of the evaporated water. In this regard, distillation apparatus 100 generally includes a flow substrate or base member 102, an intermediate panel 104, and a cover panel 106. Base member 102 is separated from intermediate panel 104 to define an evaporation chamber 108, and cover panel 106 is separated from intermediate panel 104 to define a condensation chamber 109.

Base member 102 may be a molded member formed from a polymeric material, and includes an inlet 120 located at a first end 122 and an outlet 124 located at a second end 126. Although described as being formed from a polymeric material, it should be understood that base member 102 may be formed from other materials, such as metal or some other type of material, as desired. In particular, it is preferable that the material selected exhibits low thermal conductivity so as to assist in retaining thermal energy in the brine as it passes over the base member 102. Inlet 120 and outlet 124 may each be in communication with a source of brine 123 so that a flow of brine enters inlet 120, travels along a length L of base member 102 (as will be described in more detail below), and exits outlet 124 to return to the source of brine 123 in a continuous manner. Inlet 120 and outlet 124 each include an aperture 128 formed in a sidewall 130 of base member 102, and a trench 132 that extends substantially the width W of base member.

As the brine enters inlet 120 and begins to fill trench 132, the brine will enter a notch 134 that connects trench 132 with a flow path 136 of base member 102. Flow path 136 can be generally described as a distribution feature that may be varied dependent upon the nature of the brine so as to optimize its function. In this regard, flow path 136 as a distribution feature is designed to facilitate the even flow of brine while in the evaporation chamber 108 to regulate the rate of brine flow, and the corresponding time of exposure of the brine surface (while it is within the evaporation chamber 108) to the air/vapor mixture above it, and into which evaporative mass transfer of vapor is undertaken. The surfaces of the flow path 136 over which brine is passed are constructed of and/or coated/covered with materials of absorptive and emissive characteristics such that a maximum amount of net solar irradiation is absorbed and subsequently transmitted by re-radiation and direct convection to the brine flowing through the evaporation chamber 108.

In the illustrated embodiment, flow path 136 is in a serpentine configuration that meanders back and forth in a width direction along the length L of base member 102. Although a pair of flow paths 136 are illustrated, it should be understood that base member 102 can include a single flow path 136, or a number of flow paths 136 greater than two, if desired. Legs of the flow path 136 that meander back and forth are separated by sidewalls 140 to control flow of the brine through the flow path 136 in the back and forth manner. In addition, ridges 142 may be present that extend along at least a portion of flow path 136. Ridges 142 preferably have a height less than sidewalls 140 such that ridges 142 can direct the brine through and along the flow path 136, while also allowing the brine to flow over the ridges 142 in high flow rate conditions. Regardless, the use of ridges 142 further assists in creating tortuous flow of the brine through flow path 136 that assists in increasing evaporation of the water from the brine. The brine subsequently exits flow path 136 by entering trench 132 of outlet 124, and exits distillation apparatus 100 through aperture 128 in communication with trench 132 before being reintroduced at inlet 120.

A frame member 144 is mounted to base member 102, and is configured to support intermediate panel 104 and cover panel 106. Frame member 144 may be formed from a rigid material such as aluminum or stainless steel, or may also be formed from a polymeric material like base member 102. In some embodiments where frame member 144 forms part of condensation chamber 109, it is preferable that the material selected for frame member 144 enhances thermal conductivity or other properties in a manner that is sufficient to promote condensation. In other embodiments (described later) where frame member 144 forms part of evaporation chamber 108, the material selected for frame member 144, or at least a portion of frame member 144, should be insulated to enhance evaporation. Regardless, frame member 144 includes a pair of side panels 146 that extend along the length L of base member 102, and a pair of end panels 148 that extend along the width W of base member 102. Flanges 150 are attached to an interior surface 152 of side panels 146 for supporting intermediate panel 104. In addition, a trough 154 is attached to an interior surface 156 of one of the end panels 148 for collection of condensed fresh water obtained during operation of distillation apparatus 10. Trough 154 extends along substantially an entire width W of base member 102, and is in communication with a distillate outlet 158 where the fresh water produced during the distillation process exits the distillation apparatus 100.

As noted above, flanges 150 support intermediate panel 104. Intermediate panel 104 may be fixed to flanges 150 using screws (not shown) or some other attachment method. Alternatively, intermediate panel 104 may simply rest on flanges 150, which allows intermediate panel 104 to be easily removed from distillation apparatus 100. It is important to note, however, that intermediate panel 104 is spaced apart from one of the end panels 148 by a gap 160, which allows for air flow between evaporation chamber 108 and condensation chamber 109, as will be described in more detail below.

Intermediate panel 104 is a transparent member or plate 162 formed of glass, polycarbonate, or some other transparent material, and may include one or more internal or external surface coatings, treatments, or chemical compositions designed so as to reflect a portion of the thermal radiation in the predominant wavelength range of that which is re-radiated by the flowing, heated brine and base member 102 materials when they are exposed to insolation. Intermediate panel 104 may use materials and coatings typically found in what is commonly referred to as "low-e" or "low-emissivity" glass as used in the glazing of residential and commercial buildings, and certain types of such glass may be found directly suitable for certain applications of the present disclosure. In this regard, intermediate panel 104 is preferably formed from a material that assists in thermally insulating evaporation chamber 108 from condensation chamber 109, while being further designed to maximize its net transmissivity to insolation, thereby maximizing thermal energy disposition into the brine.

Intermediate panel 104 may be a single-walled panel of material, or a double-walled panel of material configured to maximize conductive and convective thermal resistance, while simultaneously exhibiting the radiative thermal properties above. In addition, intermediate panel 104 may be treated in a manner with a coating that promotes the formation and rapid separation of droplets of condensation and to assist in the runoff of any such condensation that may fall upon it from cover panel 106. A further effect of the intermediate panel 104 is to capture condensation on its upper surface that would otherwise have been redeposited into the evaporation chamber 108 after separation from the interior surface of the top cover panel 106, thereby increasing effectiveness and distillate output.

In the illustrated embodiment, distillation apparatus 100 includes a plurality of fans 164 that are fitted in such a manner to force flow of the air/vapor mixture through the evaporation chamber 108 and the condensation chamber 109. In particular, the fans 164 are located proximate second end 126 of the base member 102 (i.e. near its lower end), and are fixed to or supported by frame member 144. Fans 164 may draw from an inlet (not shown), or recirculate some or all of the air/vapor mixture within condensation chamber 109. Although a plurality of fans 164 are illustrated, it should be understood that only a single fan 164 is needed according to the present disclosure. An automatic control system (not shown) that monitors pertinent variables such as temperatures, humidity levels, and the like may be used to facilitate control of the fans 164 to optimize production of distillate.

Cover panel 106 encloses frame member 144. Cover panel 106 includes a transparent member 166 formed of glass, polycarbonate, or some other type of transparent material that is configured to allow solar radiation to enter distillation apparatus 100. Cover panel 106 is preferably constructed to exhibit minimum conductive and radiative thermal resistance properties. In addition, the interior surface cover panel 106 may be treated in a manner with a coating, or made from a particular material, that promotes the formation and separation of droplets of condensation. Further, a drip initiator 145 may be attached to or located proximate to cover panel 106 to promote separation of droplets of condensation from cover panel 106 into trough 154.

In this regard, the materials and design of cover panel 106 are preferably selected such that the droplets of condensation are formed and separated as quickly as possible. The drop-wise formation of condensation is desirable in comparison to film-wise formation of condensation as it demonstrates thermal transfer—and thereby rates of condensation—that is of an order of magnitude greater that film-wise condensation. The interior surface of the transparent cover panel 106 may be treated with a coating, and/or configured in a way, or made from a particular material, such that the drop-wise, rather than film-wise, condensation is promoted. This surface may otherwise also be treated in such a manner than condensation may more quickly run down its slope, thereby reducing any obscuration effect to insolation and increasing the net output of the device. The upper surface of the intermediate panel 104 may be similarly treated.

Cover panel 106 may be attached to frame member 144 using clamps (not shown), or some other attachment method. Regardless, cover panel 106 is easily removable from frame member 144. The exterior, and/or interior, surfaces of cover panel 106 may also be treated, in whole or in part, with a film coating and/or layer of photovoltaic material to allow the production of electric power to be used within the device (such as to power the fan 164) or for other purposes. Such a treatment may be applied to the extent that sufficient insolation in suitable wavelength bandwidths may be transmitted through the cover panel 106, and that sufficient thermal energy may be otherwise transmitted through it to the external environment, in order to allow continued distillation function as described herein.

Now operation of distillation apparatus 100 will be described. In the conventional "solar still" described above, the basin is generally oriented at level, with the amount of brine held therein being maintained either manually or automatically. A key aspect of the present disclosure, in contrast, is that there is no brine basin per se. Rather, distillation apparatus 100 includes evaporation chamber 108 that is inclined at an angle such that when the brine is introduced through the inlet 120, the brine will travel through flow paths 136. To incline distillation apparatus 100, distillation apparatus 100 may be supported by a support structure (not shown) that supports first end 122 at a height greater than second end 126 such that the flow of brine through flow paths 136 is facilitated, such that the drainage of condensation of fresh water (or other distillate) accumulated within distillation apparatus 100 is facilitated, and such that maximum areal exposure of the distillation apparatus 100 to insolation is facilitated. The angle of inclination may be any angle desired that facilitates these aspects. For example, the angle of inclination may range between ten to thirty degrees, or may be inclined at angles greater than or less than this range.

As the brine travels through flow paths 136, the ridges 142 and sidewalls 140 regulate the rate of brine flow and the corresponding time of exposure of the brine to the air/vapor mixture above it such that evaporative mass transfer of vapor is undertaken. The flow paths 136 may be constructed of or coated/covered with materials having absorptive and emissive characteristics such that a maximum amount of net solar radiation is absorbed and subsequently transmitted by re-radiation and direct convection to the brine flowing through the flow channels, which increases the rate of evaporation of the water from the brine while in the evaporation chamber.

As the brine flows through the flow paths 136, the intention is to cause relatively dry air to flow over the brine in the evaporation chamber 108 in a direction that is opposite to that of the flow direction of the brine, through the gap 160 between intermediate panel 104 and frame member 144 that provides communication between the evaporation chamber 108 and the condensation chamber 109, and then through the condensation chamber 109 formed between the cover panel 106 and the intermediate panel 104. By using the fans 164 to force air in the opposite direction through the evaporation chamber 108 over the flow of brine, the relatively dry air becomes a more humid air/vapor mixture as it passes, in the counter-flow fashion, over the flowing brine in the evaporation chamber 108. Then, as the relatively humid air/vapor mixture then passes through the air gap 160 and enters the condensation chamber 109, the humid air/vapor mixture encounters the relatively cooler surface of the transparent cover panel 106. Condensation (i.e., distillate) then forms on the interior surface 107 of the cover panel 106. Then, due to the action of gravity in conjunction with the incline of the cover panel surface 107, the condensation either runs down the surface 107, and/or falls onto the upper surface 168 of the inclined intermediate panel 104. The condensation may then be collected in the trough 154 where it is then directed into the distillate outlet 158.

As noted above, base member 102 may be a molded member formed from a material, or may be coated with a material, that—in conjunction with the pertinent emissive, reflective and transmissive characteristics of intermediate panel 104—permits a maximum amount of net solar irradiation to be deposited into the brine and humidified air passing through the evaporation chamber 108, while a minimum amount is deposited into the condensation chamber 109. The effect of this is to increase both evaporation and condensation rates through fundamental thermodynamic relationships.

For example, versus a conventional "solar still," internal surface 107 temperatures experienced at the cover panel 106 will be reduced relative to the temperature of the air/vapor mixture flowing against that surface 107, increasing the capacity of the cover panel 106 to absorb and transmit thermal energy deposited by forming droplets (or films) of liquid distillate (i.e. condensate). Moreover, a lower amount of energy from solar irradiation will be transmitted to the air/vapor mixture once it has left the evaporation chamber 108, increasing its relative humidity, even while reducing its temperature. The former effect can be shown to be larger than the latter in terms of increasing condensation rate against the cover panel interior surface of a given temperature. In sum, a greater amount of solar irradiation is directed toward evaporation—and toward increasing relative humidity of the air flowing over the brine—and correspondingly less toward increasing the temperature of the air/vapor mixture following evaporation. In turn, lower condensing surface temperatures are maintained, which yields an increased overall condensation rate.

A primary advantage of this configuration in comparison to that of the conventional "solar still" is that the resulting flow of brine presents a continuously optimized brine depth and a moving, complex surface interface relative to the air/vapor mixture above it, which facilitates effectively forced convective thermal energy and mass transfer to yield significantly higher evaporation rates. A second advantage of this configuration is that the distillation apparatus 100 can be formed to be very compact relative to the conventional designs because evaporation is more directly tied to the flow of brine, and reverse flow of air over the brine. In this regard, the exposed surface area of the brine can be reduced, while still maintaining superior evaporation thereof due to the flow of the brine, and counter-flow of air over the brine.

It should be understood that distillation apparatus 100 may include various adjustable mixing dampers (not shown) or flow valves (not shown) that may be fitted at inlet 120 and outlet 124 locations such that a mixture ratio of inlet air and recirculated air/vapor mixture may be regulated so as to optimize the thermodynamic state (humidity and temperature) of air/vapor mixture exposed to the interior cover panel surface 107. The adjustable dampers or valves may be actuated by a suitable manual and/or automatic control system (not shown) so as to facilitate adjustment in response to variable environmental conditions and/or to execute a predetermined process routine(s). Moreover, the dampers or valves may be fitted to allow exhausting a fraction of the air/vapor mixture after it passes through the condensation chamber 109. Such exhausted air would therefore be replaced by inlet air. Under certain conditions, this may increase net condensation (and therefore distillate) output. Moreover, under certain conditions, distillate may be extracted from humid inlet air alone, or with little or no availability of brine.

The flow rate of brine, to be optimized for a given set of environmental conditions, brine inlet temperatures, and other design parameters, may be controlled via a pump 125 and/or a gravitational feed system (not shown). In turn, a suitable manual or automatic control system (not shown) may be employed to this end, and which may also be used to execute predetermined process routines. Such a routine may include, for example, the processing of brine preheated during daylight hours, which has been stored at source 123 or in adjoining insulated tanks or vessels (not shown), at night when both ambient and background (radiative) sky temperatures are reduced, further reducing temperatures on condensing surfaces and increasing the net production rate of distillate. To this end, flow control valves (not shown) may be incorporated, either directly, or via adjoining external devices. Moreover, the present disclosure contemplates the use of heated brine which is subsequently stored in adjoining insulated storage tanks or containers (not shown), and then later used to distill the heated brine as ambient conditions warrant. When used to preheat brine for later distillation, the fan 164 would not be utilized, and/or airflow through the device minimized via closure of the valves/dampers, so as to minimize brine evaporation rates.

Distillation apparatus 100 may also function generally as a thermal solar energy collector where necessary, since any compatible liquid to be used as a working fluid may be passed through the brine flow chamber and exposed to net insolation. In such an application, the fan 164 would not be utilized, and/or airflow through the device minimized via closure of the valves/dampers, so as to minimize evaporation rates of the working fluid, and maximize the temperature increase of the working fluid. Operation as a thermal energy collector may be conducted, for example, during process routines such as those already described above, wherein brine is preheated for storage and later distillation.

Figure 4:
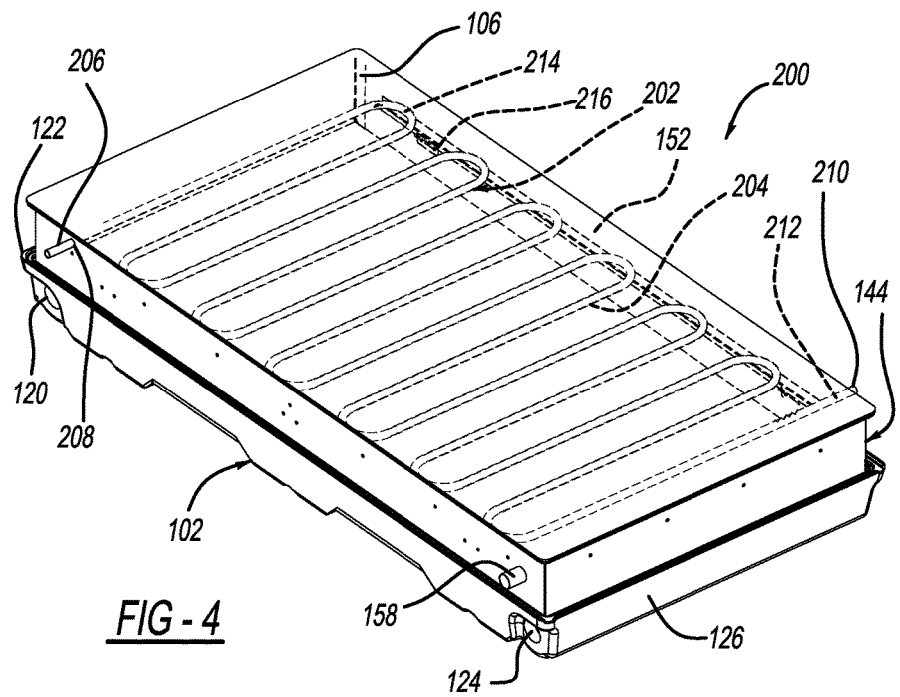
FIG. 4 is a perspective view of a distillation apparatus including a heat exchanger according to a principle of the present disclosure.
Figure 5:
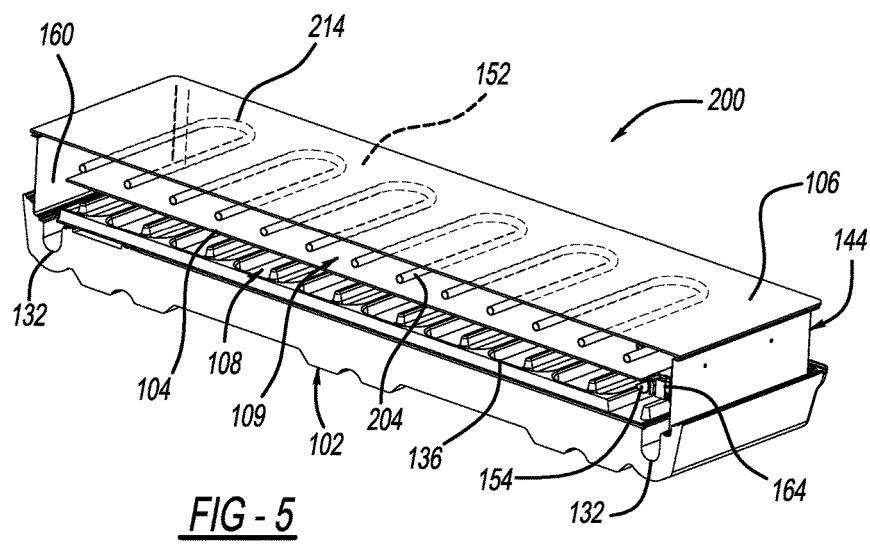
FIG. 5 is a perspective cross-sectional view of the distillation apparatus illustrated in FIG. 4.

Now referring to FIGS. 4 and 5, a distillation apparatus 200 is illustrated. Distillation apparatus 200 is substantially similar to distillation apparatus 100, described above. The only difference between distillation apparatus 200 and distillation apparatus 100 is that distillation apparatus 200 includes a heat exchanger system 202 supported by frame member 144 within condensation chamber 109. Heat exchanger system 202 includes an elongated tube 204 having an inlet 206 supported at an aperture 208 formed in frame member 144, and an outlet 210 supported at an aperture 212 formed in frame member 144. Between inlet 206 and outlet 210, tube 204 meanders back and forth between cover panel 106 and intermediate panel 104. Tube 204 is configured to carry brine to and from the source 123 before it is directed to inlet 120 of base member 102. Bends 214 of tube 204 are supported by secondary flanges 216 attached to interior surfaces 152 of frame member 144 such that tube 204 is suspended between cover panel 106 and intermediate panel 104. Tube 204 may be formed from a rigid polymeric or metal material. If a polymeric material is selected, it may be transparent.

During operation, with suitable brine inlet temperatures, condensation will be induced on the exterior surface of tube 204, thereby directing some of the heat of condensation into the brine and increase the brine temperature before it is directed into the inlet 120 of base member 102. The preheating of the brine assists in improving the overall efficiency of distillation apparatus 200. Further, to help reduce the offsets of obscuration of solar irradiation of the evaporation chamber 108 via the tube 204, the upper surfaces of the tube 204 that are exposed to the solar radiation may be coated with a suitable absorptive material to further assist in the transmittal of thermal energy to the brine. While condensation may be reduced on these surfaces as their temperatures increase due to the absorptive coating, the characteristic of this coating may be calibrated to maximize net thermal energy transfer into the brine for a given set of environmental conditions and design parameters. Further, the underside of the tube 204 may be equipped with a reflective coating and/or otherwise treated so as to minimize absorption of any radiation transmitted through the intermediate panel 104 as emitted from the evaporation chamber 108 below it, and/or by the intermediate panel 104 itself, by reflecting it back toward the brine. This also has the effect of lowering the underside surface temperatures of the tube 204, thereby increasing the rate of condensation onto that surface. Such condensation, as it builds up, falls onto intermediate panel 104, and drains into trough 154.

Figure 6:
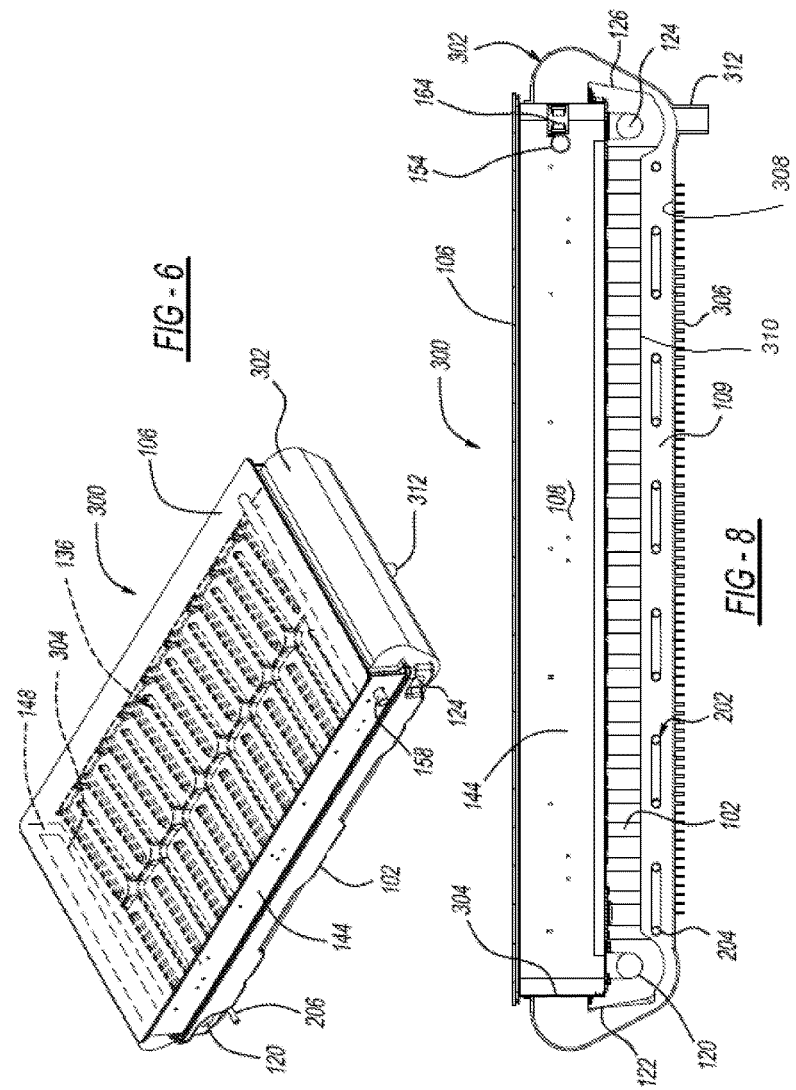
FIG. 6 is a perspective view of another distillation including apparatus according to a principle of the present disclosure.
Figure 7:
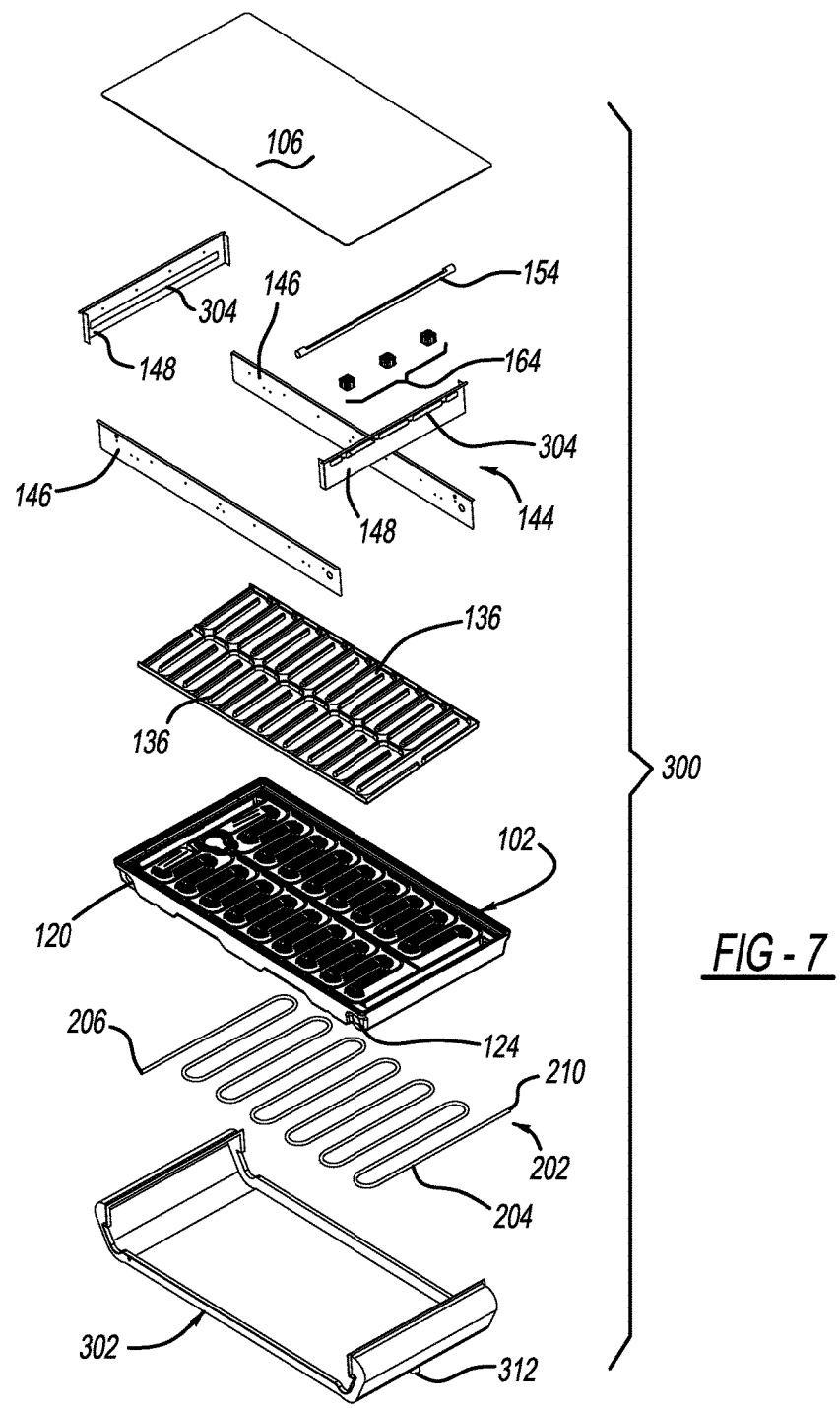
FIG. 7 is an exploded perspective view of the distillation apparatus illustrated in FIG. 6.
Figure 10:
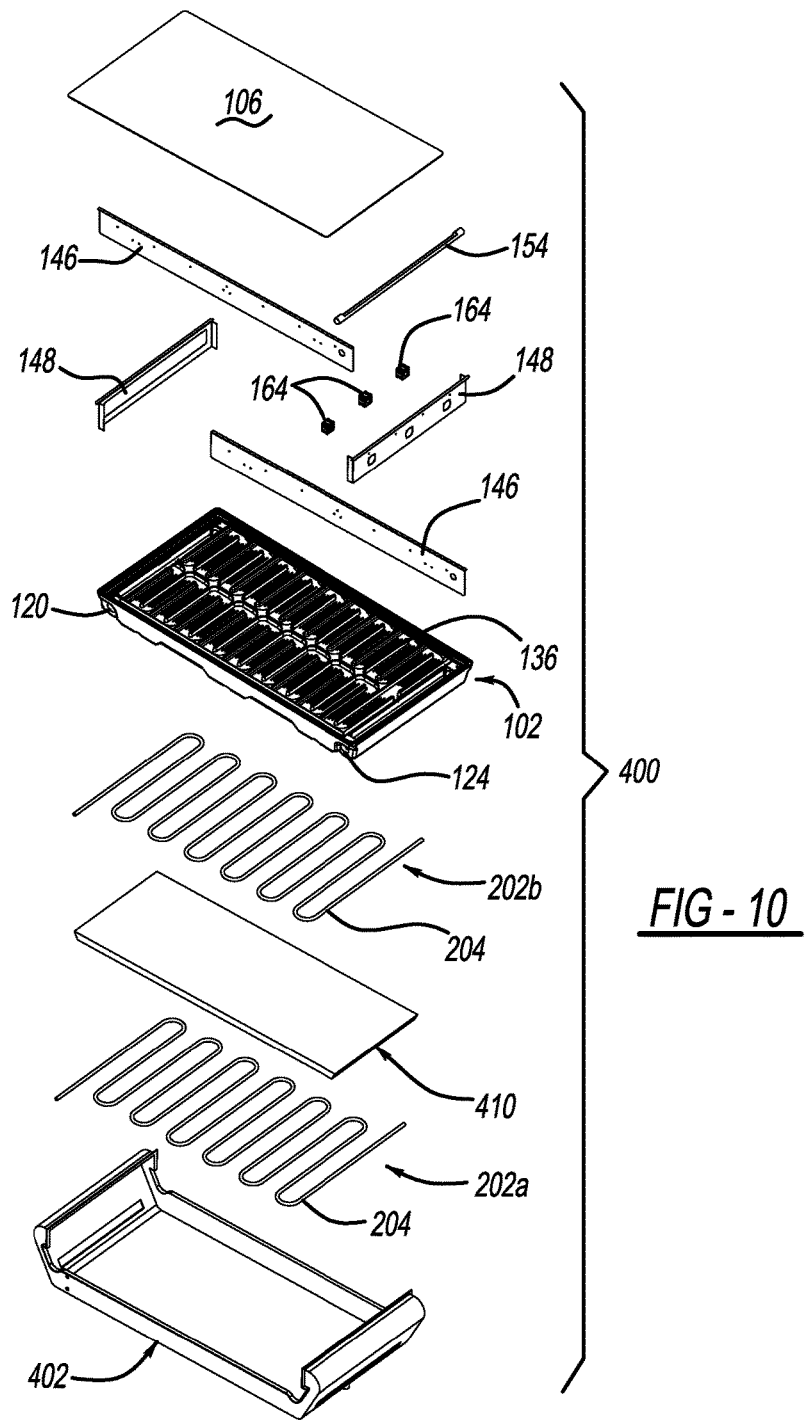
FIG. 10 is an exploded perspective view of the distillation apparatus illustrated in FIG. 9.
Figure 12:
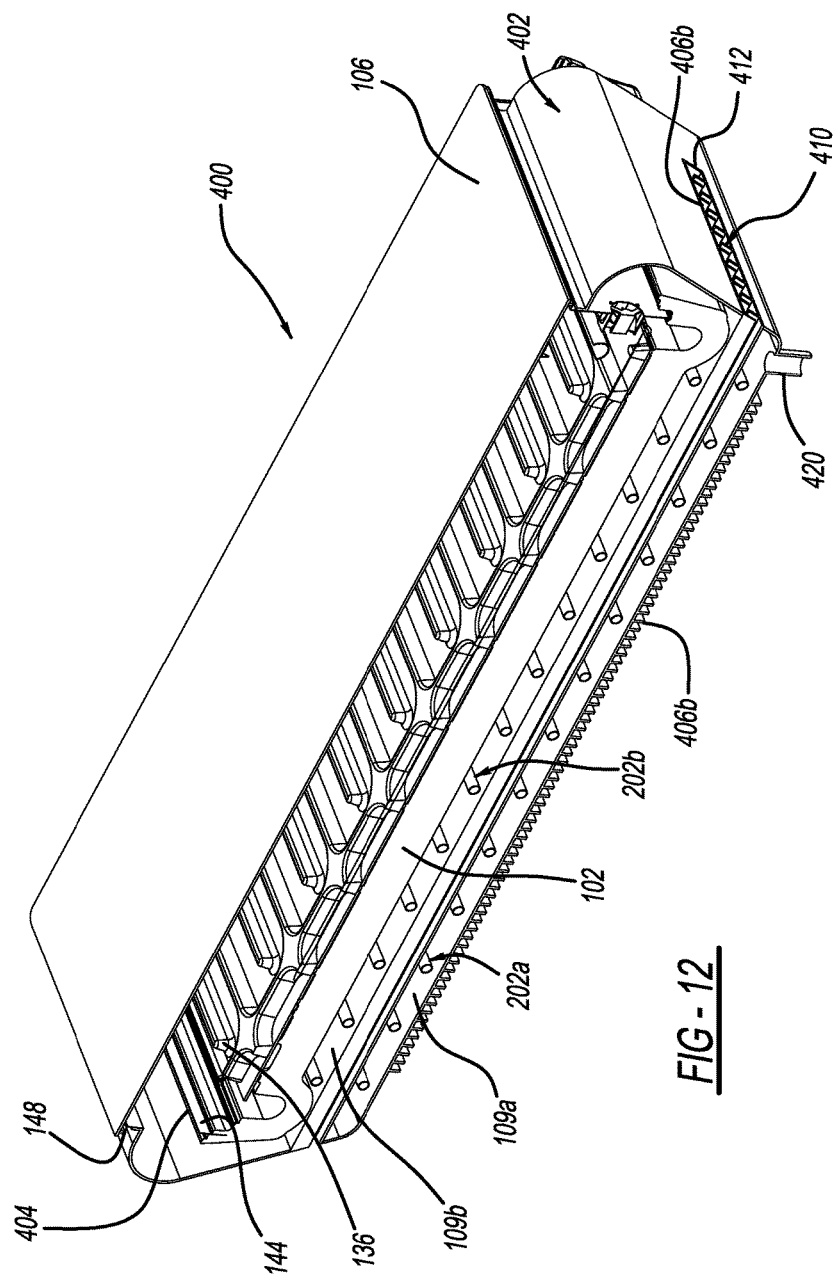
FIG. 12 is a perspective cross-sectional view of the distillation apparatus illustrated in FIG. 9.

Now referring to FIGS. 6-8, yet another distillation apparatus 300 according to the present disclosure is illustrated. Distillation apparatus 300 is similar to distillation apparatus 100, with the exceptions that the location of evaporation chamber 108 and condensation chamber 109 are opposite, and the intermediate panel 104 is removed. Indeed, as best shown in FIGS. 7 and 8, it can be seen that distillation apparatus 300 includes features similar to distillation apparatus 100 including base member 102, frame member 144, fans 164, and cover panel 106. Distillation apparatus 300, however, also includes an exterior housing 302 that in conjunction with base member 102 defines condensation chamber 109. The volume defined between cover panel 106 and base member 102 defines evaporation chamber 108.

Housing 302 may be attached to frame member 144 by welding, brazing, or some other attachment method known to one skilled in the art. Housing 302, therefore, may be formed from materials similar to frame member 144 described above. Alternatively, housing 302 may be formed from a material that is different from frame member 144. Housing 302 is shaped to provide continuous flow from evaporation chamber 108 to condensation chamber 109, and then back into evaporation chamber 108. In this regard, to allow for fluid communication between evaporation chamber 108 and condensation chamber 109, frame member 144 may include a pair of cut-outs or flow-through passages 304 formed in end panels of 148 thereof.

In addition, housing 302 may include a convective heat removal feature such as the plurality of fins 306 that are illustrated, which are designed to maximize convective heat removal from housing 302. The effect of fins 306 is that condensation rate is increased from the air/vapor mixture flowing through condensation chamber 109, as the temperature at surface 308 of housing 302 opposite to fins 306 will be decreased. Although the use of fins 306 is illustrated and described, it should be understood that housing 302 may be equipped with other convective heat removal features that are designed to maximize convective heat removal from its external surface. For example, housing 302 may include a coating of a material different from the housing 302 that effectively assists in convective heat removal, or may include structural features similar to fins (such as a wavy or rough surface) that facilitate convective heat removal. Further, an external fan or fans (not shown) may be employed to apply forced convention to the undersurface of housing 302, which will have the effect of increasing the condensation rate from the air/vapor mixture flowing through the condensation chamber 109, as the temperature of the surface 308 of the housing 302 (and side surfaces, as practicable) will be minimized. Moreover, housing 302 may support a heat exchanger system 202 therein, the components of which are described above such that description here will be omitted.

Distillation apparatus 300 operates in the same manner as distillation apparatus 100. In this regard, as the brine flows through the flow paths 136 of base member 102, relatively dry air is caused by fans 164 to flow over the brine in the evaporation chamber 108 in a direction that is opposite to that of the flow direction of the brine, through the flow-through passages 304 formed in frame member 144 and into housing 302, and then through the condensation chamber 109 formed between the base member 102 and the housing 302. By using the fans 164 to force air in the opposite direction through the evaporation chamber 108 over the flow of brine, the relatively dry air becomes a more humid air/vapor mixture as it passes, in the counter-flow fashion, over the flowing brine in the evaporation chamber 108. Then, as the relatively humid air/vapor mixture then passes through the flow-through passages 304 and enters the condensation chamber 109, the humid air/vapor mixture encounters the relatively cooler surface 308 located opposite that of fins 306. Condensation (i.e., distillate) then forms on the interior surface 308 of the housing 302. Then, due to the action of gravity in conjunction with the incline of the distillation apparatus 300, the condensation runs down the surface 308 and/or falls onto the surface 308 from the underside 310 of base member 102. The condensation may then pass through distillate outlet 312 formed in housing 300.

Now referring to FIGS. 9 to 12, yet another distillation apparatus 400 is illustrated. Distillation apparatus 400 is substantially similar to distillation apparatus 300, described above. Distillation apparatus 400, however, includes a housing 402 that is larger than housing 302. That is, housing 402 defines a pair of condensation chambers 109a and 109b rather than only a single condensation chamber 109. Further, as can be seen in FIG. 11, housing 402 houses a pair of heat exchanger systems 202a and 202b in each condensation chamber 109a and 109b. Heat exchanger systems 202a and 202b are similar to those described above, and description herein will be omitted. It should be understood, however, that in the illustrated embodiment the heat exchanger systems 202a and 202b in each condensation chamber 109a and 109b are in fluid communication with each other. Alternatively, one of the heat exchanger systems (e.g., 202b) could be in communication with another distillation apparatus (e.g., like the distillation apparatus 100) that is located proximate distillation apparatus 400, and does not include its own heat exchanger system.

Similar to housing 302, housing 402 may be attached to frame member 144 by welding, brazing, or some other attachment method known to one skilled in the art. Housing 402, therefore, may be formed from materials similar to frame member 144 described above. Alternatively, housing 402 may be formed from a material that is different from frame member 144. Housing 402 is shaped to provide continuous flow from evaporation chamber 108 to condensation chambers 109, and then back into evaporation chamber 108. In this regard, to allow for fluid communication between evaporation chamber 108 and condensation chambers 109a and 109b, frame member 144 may include a pair of cut-outs or flow-through passages 404 formed in end panels of 148 thereof.

In addition, similar to housing 302, housing 402 may include a convective heat removal feature such as a plurality of fins 406a that are designed to maximize convective heat removal from housing 402. The effect of fins 406a is that condensation rate is increased from the air/vapor mixture flowing through condensation chamber 109a, as the temperature at surface 408 of housing 402 opposite to fins 406a will be decreased. In addition, a baffle structure 410 is located between condensation chambers 109a and 109b that is in communication with air located exterior to distillation apparatus 400 through opening 412. Baffle structure 410 includes a plurality of fins 406b that are designed to operate in the same manner as fins 406a. That is, the temperature at surfaces 414 and 416 of baffle structure opposite to fins 406b located within baffle structure 410 will be decreased. Again, it should be emphasized that the use of fins 406a and 406b is only exemplary, and other features that promote convective heat removal are contemplated.

Distillation apparatus 400 operates in the same manner as distillation apparatus 300. In this regard, as the brine flows through the flow paths 136 of base member 102, relatively dry air is caused by fans 164 to flow over the brine in the evaporation chamber 108 in a direction that is opposite to that of the flow direction of the brine, through the flow-through passages 404 formed in frame member 144 and into housing 402, and then through the condensation chambers 109a and 109b formed between the base member 102 and the housing 402. By using the fans 164 to force air in the opposite direction through the evaporation chamber 108 over the flow of brine, the relatively dry air becomes a more humid air/vapor mixture as it passes, in the counter-flow fashion, over the flowing brine in the evaporation chamber 108. Then, as the relatively humid air/vapor mixture then passes through the flow-through passages 404 and enters the condensation chambers 109a and 109b, the humid air/vapor mixture encounters the relatively cooler surfaces 408, 414, and 416 located opposite that of the fins 406a and 406b. Condensation (i.e., distillate) then forms on the cooler surfaces 408, 414, and 416 of the housing 402 and baffle structure 410. Then, due to the action of gravity in conjunction with the incline of the distillation apparatus 400, the condensation runs down the surfaces 408, 414, and 416 and/or falls onto the surfaces 408 from the underside 418 of base member 102, and from surface 416 of baffle structure 410. The condensation may then pass through distillate outlet 420 formed in housing 402.

Figure 13:
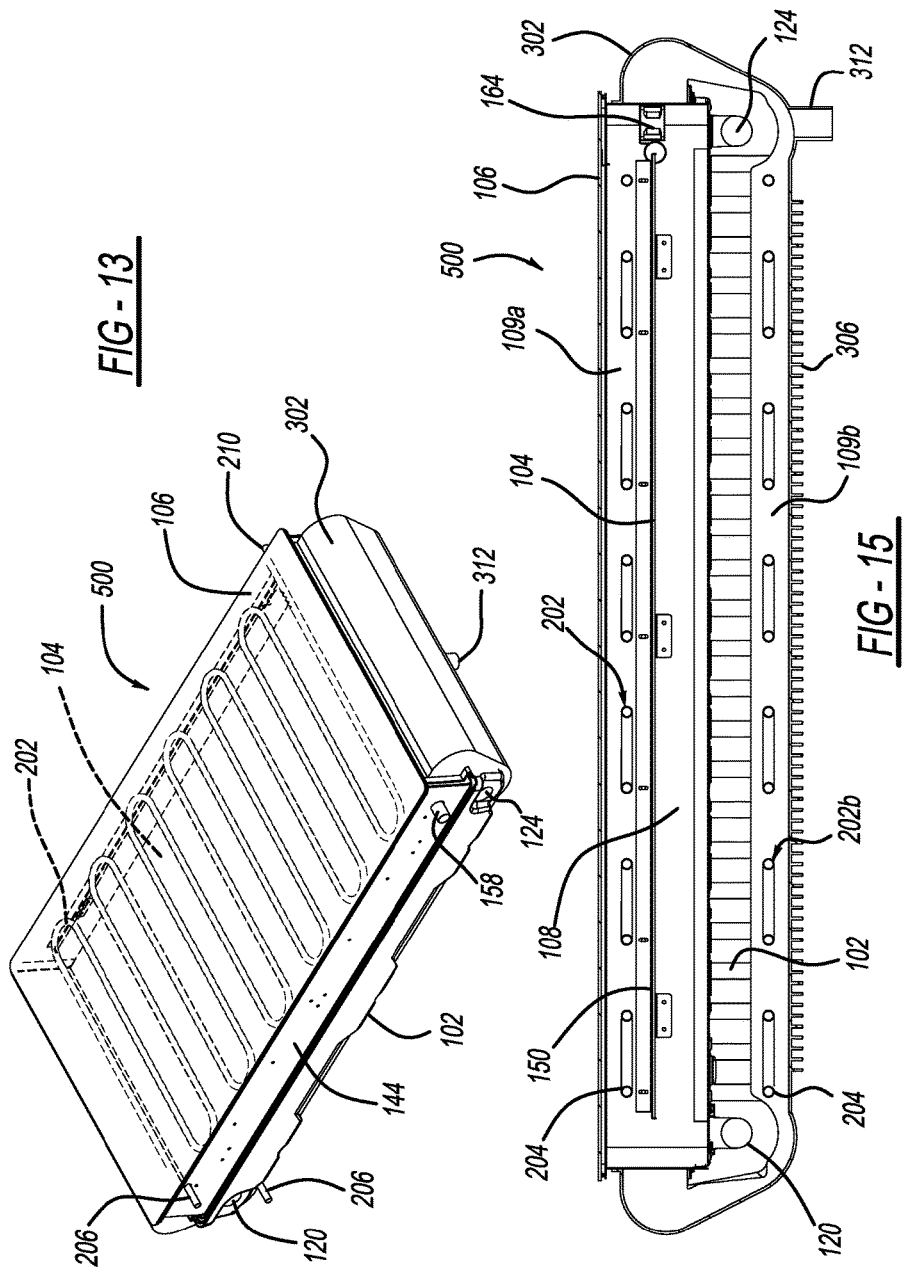
FIG. 13 is a perspective view of another distillation including apparatus according to a principle of the present disclosure.
Figure 14:
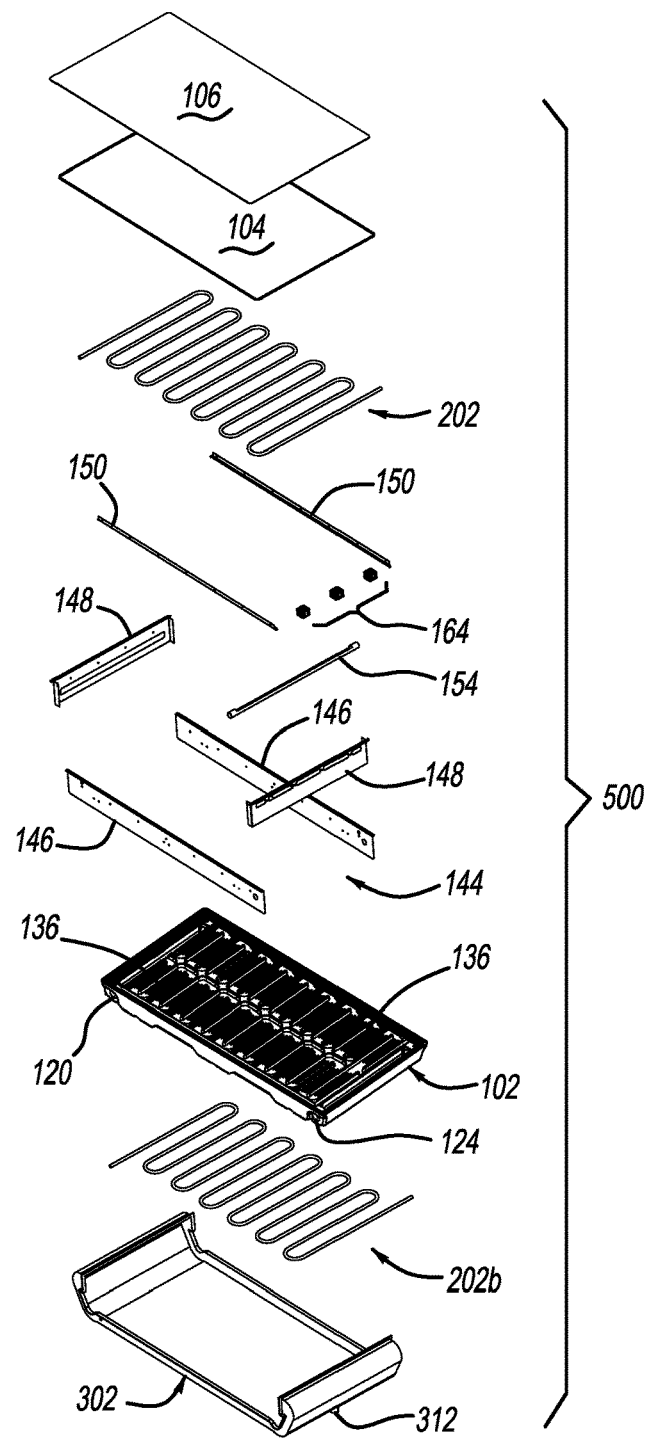
FIG. 14 is an exploded perspective view of the distillation apparatus illustrated in FIG. 13.

Now referring to FIGS. 13-15, another distillation apparatus 500 according to the present disclosure is illustrated. Distillation apparatus 500 combines the features of distillation apparatus 200 and distillation apparatus 300. That is, distillation apparatus 500 is formed from the distillation apparatus 200 illustrated in FIGS. 4 and 5, includes the additional features of the housing 302 and heat exchanger system 202 illustrated in FIGS. 6 to 8. The heat exchanger system within housing 302 is labeled as heat exchanger 202b so as to not cause confusion. Because these features and operation thereof are the same as previously described, description of the features will be omitted here. The benefits of distillation apparatus 500 is that multiple condensation chambers 109a and 109b are formed, which can further increase the yield of distillate produced by distillation apparatus 500. The air flow induced by fans 164 still flows in a counter-flow fashion over the flow of brine, and then can travel into each of condensation chamber 109a and 109b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solar distillation apparatus configured to produce a distillate from a source liquid mixture, comprising:
   a housing;
   a transparent cover panel attached to and spaced apart from the housing to define a volume; and
   a base member defining a flow path, the base member located between the housing and the transparent cover panel and within the volume defined by the transparent cover panel and the housing to divide the volume into an evaporation chamber located between the transparent cover panel and the base member and a condensation chamber between the base member and the housing,
   wherein the evaporation chamber communicates with the condensation chamber,
   the condensation chamber includes a first condensation chamber and a second condensation chamber separated by a baffle structure that communicates with the atmosphere, and
   the flow path of the base member is configured to carry the source liquid mixture in a first direction in the evaporation chamber to increase evaporation of a liquid from the source liquid mixture, and the evaporated liquid is configured to flow from the evaporation chamber in a second and opposite direction into the condensation chamber where the evaporated liquid condenses into the distillate.

2. The solar distillation apparatus according to claim 1, wherein the base member includes an inlet and an outlet that are each in communication with a source of the source liquid mixture such that after the source liquid mixture enters the flow path of the base member from the inlet and flows along the flow path to the outlet, any non-evaporated source liquid mixture will be returned to the source.

3. The solar distillation apparatus according to claim 1, wherein the flow path of the base member has a serpentine configuration that allows the source liquid mixture to travel through the flow path in a meandering fashion along a length of the base member to increase evaporation of the liquid from the source liquid mixture.

4. The solar distillation apparatus according to claim 3, wherein legs of the flow path that meander back and forth are separated by sidewalls that direct the flow of source liquid mixture in the flow path, and the legs of the flow path each include a plurality of ridges formed along at least a portion of a length of the legs for further directing the flow of source liquid mixture in the flow path and creating tortuous flow of the source liquid mixture to increase evaporation of the liquid from the source liquid mixture.

5. The solar distillation apparatus according to claim 1, wherein the base member is inclined to allow flow of the source liquid mixture through the flow path.

6. The solar distillation apparatus according to claim 1, further comprising a heat exchanger system located in at least one of the evaporation chamber and the condensation chamber, the heat exchanger system being in communication with the source of the source liquid mixture such that the source liquid mixture carried by the heat exchanger system is pre-heated before the source liquid mixture is supplied to inlet of the base member.

7. The solar distillation apparatus according to claim 1, further comprising a fan for increasing a flow rate of the evaporated liquid in the second and opposite direction into the condensation chamber to increase evaporation of the liquid from the source liquid mixture.

8. The solar distillation apparatus according to claim 1, wherein the housing includes a convective heat removal feature on an exterior surface thereof.

9. The solar distillation apparatus according to claim 1, wherein the baffle structure includes a convective heat removal feature therein.

10. The solar distillation apparatus according to claim 1, wherein the first condensation chamber and the second condensation chamber each include a heat exchanger system that is in communication with a source of the source liquid mixture such that the source liquid mixture carried by the heat exchanger systems is pre-heated before the source liquid mixture is supplied to inlet of the base member.

11. A solar distillation apparatus configured to produce a distillate from a source liquid mixture, comprising:

a base member defining a plurality of flow paths that are each arranged in a serpentine configuration such that the flow paths meander back and forth along a length of the base member from a first end to an opposite second end, the first end having an inlet and the second end having an outlet, the inlet and the outlet each being in communication with a source of the source liquid mixture such that the source liquid mixture continuously flows from the source to the inlet, from the inlet through the flow paths to the outlet, and from the outlet back to the source;

a frame member attached to the base member;

a transparent cover panel attached to the frame member such that the transparent cover panel is spaced apart from the base member to define a volume therebetween, the transparent cover panel configured to allow solar radiation to enter the volume;

a transparent intermediate panel positioned between the base member and the transparent cover panel, and supported by the frame member, the transparent intermediate panel dividing the volume into an evaporation chamber located between the base member and the intermediate panel, and a first condensation chamber between the cover panel and the intermediate panel, and configured to allow the solar radiation that enters the volume to enter the evaporation chamber to heat the source liquid mixture continuously flowing therein while simultaneously limiting convective and conductive heat transfer between the evaporation and the first condensation chambers and a housing attached to and spaced apart from the base member to define a second condensation chamber, wherein the evaporation chamber communicates with the first and the second condensation chambers, the second condensation chamber includes a first sub-chamber and a second sub-chamber separated by a baffle structure that communicates with the atmosphere, and the flow paths of the base member are configured to carry the source liquid mixture in a first direction in the evaporation chamber to increase evaporation of a liquid from the source liquid mixture, and the evaporated liquid is configured to flow from the evaporation chamber in a second and opposite direction into the first condensation chamber where the evaporated liquid condenses into the distillate.

12. The solar distillation apparatus according to claim 11, wherein the baffle structure includes a convective heat removal feature therein.

13. The solar distillation apparatus according to claim 11, wherein the first sub-chamber and the second sub-chamber each include a heat exchanger system that is in communication with a source of the source liquid mixture such that the source liquid mixture carried by the heat exchanger systems is pre-heated before the source liquid mixture is supplied to inlet of the base member.

* * * * *

UNITED STATES PATENT AND TRADEMARK OFFICE
CERTIFICATE OF CORRECTION

PATENT NO. : 10,329,167 B2
APPLICATION NO. : 15/370293
DATED : June 25, 2019
INVENTOR(S) : John L. Calene Page 1 of 1

It is certified that error appears in the above-identified patent and that said Letters Patent is hereby corrected as shown below:

On the Title Page

Item (12), "Calene et al." should read -- Calene --.

Item (72), Garth J. Shcultz is removed as a named inventor.

Signed and Sealed this
Seventeenth Day of November, 2020

Andrei Iancu
*Director of the United States Patent and Trademark Office*